United States Patent
Rangarajan et al.

(10) Patent No.: US 11,799,643 B2
(45) Date of Patent: Oct. 24, 2023

(54) COLLABORATIVE ARCHITECTURE FOR SECURE DATA SHARING

(71) Applicant: Bank of America Corporation, Charlotte, NC (US)

(72) Inventors: Prabakar Rangarajan, Chennai (IN); Ramesh Alagar, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 473 days.

(21) Appl. No.: 17/152,642

(22) Filed: Jan. 19, 2021

(65) Prior Publication Data
US 2022/0231847 A1 Jul. 21, 2022

(51) Int. Cl.
H04L 9/08 (2006.01)

(52) U.S. Cl.
CPC ........ H04L 9/0869 (2013.01); *H04L 2209/46* (2013.01); *H04L 2209/56* (2013.01)

(58) Field of Classification Search
CPC .............. H04L 9/0869; H04L 2209/46; H04L 2209/56; H04L 9/008; H04L 63/0428; H04L 9/14
See application file for complete search history.

(56) References Cited

U.S. PATENT DOCUMENTS

| | | | | |
|---|---|---|---|---|
| 7,039,192 B1 * | 5/2006 | Whelan | ............... | H04L 63/0442 380/278 |
| 7,370,350 B1 * | 5/2008 | Salowey | ............... | G06F 21/445 713/168 |
| 8,312,518 B1 * | 11/2012 | Ezell | ..................... | H04L 9/3265 726/4 |
| 8,688,973 B2 * | 4/2014 | Kerschbaum | ......... | H04L 9/3073 380/282 |
| 8,700,906 B2 | 4/2014 | Kamara et al. | | |
| 9,288,039 B1 * | 3/2016 | Monet | ..................... | H04L 9/008 |
| 9,450,938 B1 | 9/2016 | Lampkins et al. | | |
| 9,536,114 B1 | 1/2017 | El Defrawy et al. | | |
| 9,736,128 B2 | 8/2017 | Premnath et al. | | |
| 9,813,234 B2 | 11/2017 | Clark et al. | | |
| 10,083,310 B1 * | 9/2018 | Lampkins | ............. | H04L 9/3093 |
| 10,396,984 B2 * | 8/2019 | French | ..................... | G09C 1/00 |
| 10,567,156 B2 | 2/2020 | Castinado et al. | | |
| 10,601,585 B1 | 3/2020 | Robinson et al. | | |
| 10,630,486 B2 * | 4/2020 | Lindell | ................... | H04L 9/085 |
| 10,686,597 B1 | 6/2020 | Lampkins et al. | | |
| 10,831,903 B2 | 11/2020 | Li et al. | | |

(Continued)

*Primary Examiner* — David Garcia Cervetti

(57) ABSTRACT

A device participates in a cyclical collaboration system. The device receives a request from a third party. A request value is determined that is associated with the request. A first random number is determined based on the first request value. The first random number is provided to a downstream device. A second random number is received that is generated by a upstream device. A first encrypted request value is determined based on the first request value, the first random number, and the second random number. The first encrypted request value is provided to a multiple party encryption subsystem. Encrypted request values generated by other participants of the cyclical collaboration network are received from the multiple party encryption subsystem. A validation score is determined based on the first encrypted request values and the encrypted request values received from the multiple party encryption subsystem.

20 Claims, 3 Drawing Sheets

(56) References Cited

U.S. PATENT DOCUMENTS

| | | | |
|---|---|---|---|
| 11,081,017 B2* | 8/2021 | Isozu | G06Q 40/00 |
| 11,201,745 B2* | 12/2021 | Barham | H04L 9/0869 |
| 11,625,490 B2* | 4/2023 | Li | H04L 9/0643 |
| | | | 713/167 |
| 2002/0052757 A1 | 5/2002 | Lewis | |
| 2008/0304657 A1* | 12/2008 | Tuyls | H04L 9/0869 |
| | | | 380/28 |
| 2010/0146299 A1* | 6/2010 | Swaminathan | G06F 21/6227 |
| | | | 707/E17.014 |
| 2012/0002811 A1 | 1/2012 | Smart | |
| 2012/0179916 A1* | 7/2012 | Staker | G06F 21/53 |
| | | | 713/189 |
| 2012/0198241 A1* | 8/2012 | O'Hare | G06F 21/602 |
| | | | 713/189 |
| 2012/0331088 A1* | 12/2012 | O'Hare | H04L 67/1097 |
| | | | 709/214 |
| 2013/0013931 A1* | 1/2013 | O'Hare | H04L 9/3231 |
| | | | 713/189 |
| 2014/0108558 A1 | 4/2014 | Borzycki et al. | |
| 2014/0173702 A1 | 6/2014 | Wong et al. | |
| 2014/0181524 A1* | 6/2014 | Itoh | H04L 9/3273 |
| | | | 713/174 |
| 2014/0279067 A1 | 9/2014 | Lei | |
| 2014/0355756 A1* | 12/2014 | Iwamura | H04L 9/008 |
| | | | 380/30 |
| 2015/0006895 A1* | 1/2015 | Irvine | G06F 21/6209 |
| | | | 713/171 |
| 2017/0310652 A1* | 10/2017 | Campagna | H04L 9/0841 |
| 2018/0123800 A1* | 5/2018 | Kim | G06F 16/1748 |
| 2018/0198601 A1* | 7/2018 | Laine | H04L 9/3239 |
| 2018/0218173 A1 | 8/2018 | Perkins et al. | |
| 2019/0020482 A1* | 1/2019 | Gupta | H04L 9/3231 |
| 2019/0116032 A1* | 4/2019 | Pogmore | H04L 9/0863 |
| 2019/0220831 A1 | 7/2019 | Rangarajan et al. | |
| 2019/0266354 A1 | 8/2019 | Banerjee et al. | |
| 2019/0268400 A1 | 8/2019 | Gaikwad et al. | |
| 2019/0273620 A1 | 9/2019 | Wu et al. | |
| 2019/0294805 A1* | 9/2019 | Taylor | G06F 21/602 |
| 2019/0296852 A1* | 9/2019 | Lazzaro | H04W 12/03 |
| 2019/0296991 A1 | 9/2019 | Burnette et al. | |
| 2019/0312734 A1* | 10/2019 | Wentz | H04L 9/0877 |
| 2019/0319932 A1 | 10/2019 | Kandregula | |
| 2019/0342083 A1* | 11/2019 | LeSaint | H04L 9/14 |
| 2019/0372760 A1* | 12/2019 | Zheng | H04L 9/085 |
| 2019/0394039 A1* | 12/2019 | Higo | H04L 9/0894 |
| 2020/0005253 A1 | 1/2020 | Rangarajan et al. | |
| 2020/0042742 A1 | 2/2020 | Bailey | |
| 2020/0043018 A1 | 2/2020 | Mossoba et al. | |
| 2020/0065571 A1 | 2/2020 | Desai et al. | |
| 2020/0067699 A1* | 2/2020 | Resch | G09C 1/00 |
| 2020/0089509 A1* | 3/2020 | Arya | G06F 9/4482 |
| 2020/0117818 A1* | 4/2020 | Latka | G06F 12/1408 |
| 2020/0118004 A1 | 4/2020 | Chen et al. | |
| 2020/0136797 A1* | 4/2020 | Yu | H04L 9/008 |
| 2020/0167497 A1 | 5/2020 | Dageville et al. | |
| 2020/0175198 A1 | 6/2020 | Moffat | |
| 2020/0186528 A1* | 6/2020 | Fan | G06F 17/16 |
| 2020/0228339 A1* | 7/2020 | Barham | H04L 9/3231 |
| 2020/0233968 A1 | 7/2020 | Sun et al. | |
| 2020/0242234 A1 | 7/2020 | Furukawa et al. | |
| 2020/0252214 A1 | 8/2020 | Cheng et al. | |
| 2020/0259800 A1* | 8/2020 | Masny | H04L 9/3242 |
| 2020/0295937 A1 | 9/2020 | Haider et al. | |
| 2020/0311307 A1* | 10/2020 | Levy | G06F 21/6254 |
| 2020/0349261 A1* | 11/2020 | Koorella | G06F 21/6209 |
| 2020/0356082 A1 | 11/2020 | Wang et al. | |
| 2020/0380091 A1 | 12/2020 | Bansal et al. | |
| 2020/0380509 A1* | 12/2020 | Billman | G06Q 20/32 |
| 2020/0387620 A1 | 12/2020 | Kuzin et al. | |
| 2020/0387624 A1 | 12/2020 | Dunjic et al. | |
| 2021/0091929 A1* | 3/2021 | Veeningen | H04L 9/3242 |
| 2021/0135837 A1* | 5/2021 | Cheung | H04L 9/008 |
| 2021/0135850 A1* | 5/2021 | Hoang | H04L 9/085 |
| 2021/0160050 A1* | 5/2021 | Moon | H04L 63/0876 |
| 2021/0194666 A1* | 6/2021 | Georgieva | H04L 9/008 |
| 2021/0328762 A1* | 10/2021 | Becher | H04L 9/008 |
| 2021/0344477 A1* | 11/2021 | Aharoni | H04L 9/008 |
| 2021/0377031 A1* | 12/2021 | Aharoni | H04L 9/3231 |
| 2022/0069980 A1* | 3/2022 | Ohara | G06F 7/556 |
| 2022/0075878 A1* | 3/2022 | Begg | G06F 21/602 |
| 2022/0231847 A1* | 7/2022 | Rangarajan | H04L 9/008 |
| 2022/0239487 A1* | 7/2022 | Seraj | H04L 9/3239 |

\* cited by examiner

COLLABORATIVE ARCHITECTURE FOR SECURE DATA SHARING

TECHNICAL FIELD

The present disclosure relates generally to data security and data sharing, more specifically to a collaborative architecture for secure data sharing.

BACKGROUND

An entity, such as a company, may receive requests from clients or customers to render a service. In some cases, the requests should be validated before a corresponding service is rendered by the entity. Often the entity lacks sufficient information for performing such validation and therefore contacts external parties or request further information from clients or customers to proceed with validation.

SUMMARY

In one embodiment, a device configured to participate in a cyclical collaboration system includes a network interface. The network interface is configured to communicate with a multiple party encryption subsystem, a downstream device, and an upstream device. The device includes a processor configured to receive a request from a third party. A first request value is determined that is associated with the request. A first random number is determined based on the first request value. The first random number is provided to the downstream device. A second random number is received that is generated by the upstream device. A first encrypted request value is determined based on the first request value, the first random number, and the second random number. The first encrypted request value is provided to the multiple party encryption subsystem. Encrypted request values generated by other participants of the cyclical collaboration system are received from the multiple party encryption subsystem. A validation score is determined based on the first encrypted request values and the encrypted request values received from the multiple party encryption subsystem.

As described above, a service-providing entity may lack access to sufficient information for validating a request received form a third party. For instance, before a party is granted access to protected information, the service-providing entity may wish to validate the identity of the party and the access rights of the party. As another example, before a requested financial transaction is rendered (e.g., such an approval of requested financing), an entity may wish to review financial records of the third party, such as a record of financing already provided to this third party. Obtaining the requisite information to validate such requests using previous technology can be an inefficient and laborious process for the both the service-providing entity and the requesting third party. As such, previous technology may result in delayed and unreliable validation decisions.

This disclosure recognizes that such validations may be improved by allowing multiple service-providing entities to operate collaboratively, such that information for a given third party that may interact with multiple entities can be shared. However, previous technology fails to provide secure and efficient tools for such collaboration.

For example, previous technology may reveal protected information associated with the collaborating entities and/or the requesting third party. For instance, if multiple entities share financial information associated with a request for financing from a third party, previous technology may reveal the amount of financing provided to the third party by each entity. This disclosure recognizes a need for improved technology for collaboration without revealing protected information from each entity.

Certain embodiments of this disclosure solve technical problems of previous technology used for multi-entity collaboration by providing a collaboration architecture that facilitates the efficient determination of validation decisions without having protected information revealed to other participating entities. For example, the disclosed system provides several technical advantages over previous technology, which include: (1) the ability to determine validation decisions with fewer communications between collaborating devices than was possible using previous technology (e.g., with a number of network calls that scales linearly, or approximately linearly, with the number of collaborating devices); (2) the implementation of multiparty encryption such that results of multi-entity validation assessments are only available to participating entities; and (3) the ability to adjust communications used for multi-entity collaboration and/or validation assessments to further improve information security in cases where one or more of the participating entities is determined to be a less trusted entity (e.g., if one entity determines that further security measures should be implemented to further obscure information from another participating entity).

As such, this disclosure may improve the function of computer systems used to share data and/or validate requests. The collaborative validation system described in this disclosure may help ensure requests are validated (or denied if appropriate) in a timely manner, thereby reducing or eliminating delays or bottlenecks imposed by previous technology. This disclosure may particularly be integrated into a practical application of a collaborative validation system which includes a plurality of service provider devices, where each service provider device is configured to participate in the collaboration architecture. The rapid and secure validation of requests, which is uniquely facilitated by this disclosure, may be particularly beneficial for entities receiving large numbers of requests in a relatively short span of time, such that services can be rendered in a timely manner. Since each service provider device is configured to communicate with devices directly upstream and downstream in the unique cyclical collaboration network of this disclosure, the number of communications transmitted for collaborative validation decisions scales approximately linearly with the number of service provider devices in the system. In some situations, a small number of additional communications may be transmitted in cases where a less trusted entity is included in the collaborative validation system, thus providing a significant further increase in security at a relatively small cost in terms of the additional network communication and processing resources consumed.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

As described above, previous technology lacks tools for efficiently and reliably allowing multiple entities to collaborate to make decisions whether a third party should be validated to obtain a requested service. For instance, if a third party, such as a company or person, requests financing, a number of finance-providing entities may already have relevant information (e.g., financial records of the third party, knowledge of existing financing) for determining whether a request for financing should be validated. The multi-entity collaboration system of this disclosure uniquely facilitates the secure determination of validation decisions for such scenarios without revealing protected information from each entity to the other entities. The multi-entity collaboration system includes a plurality of devices that communicate in a unique circular sequence that facilitates the efficient and reliable determination of validation decisions with minimal communication amongst entities and without revealing information from the participating entities. As such, this disclosure facilitates more secure, efficient, and rapid validation (or denial, if appropriate) of requests (e.g., for information access, financing, or the like) than was possible using previous technology.

Multi-Entity Collaboration System

Figure 1:
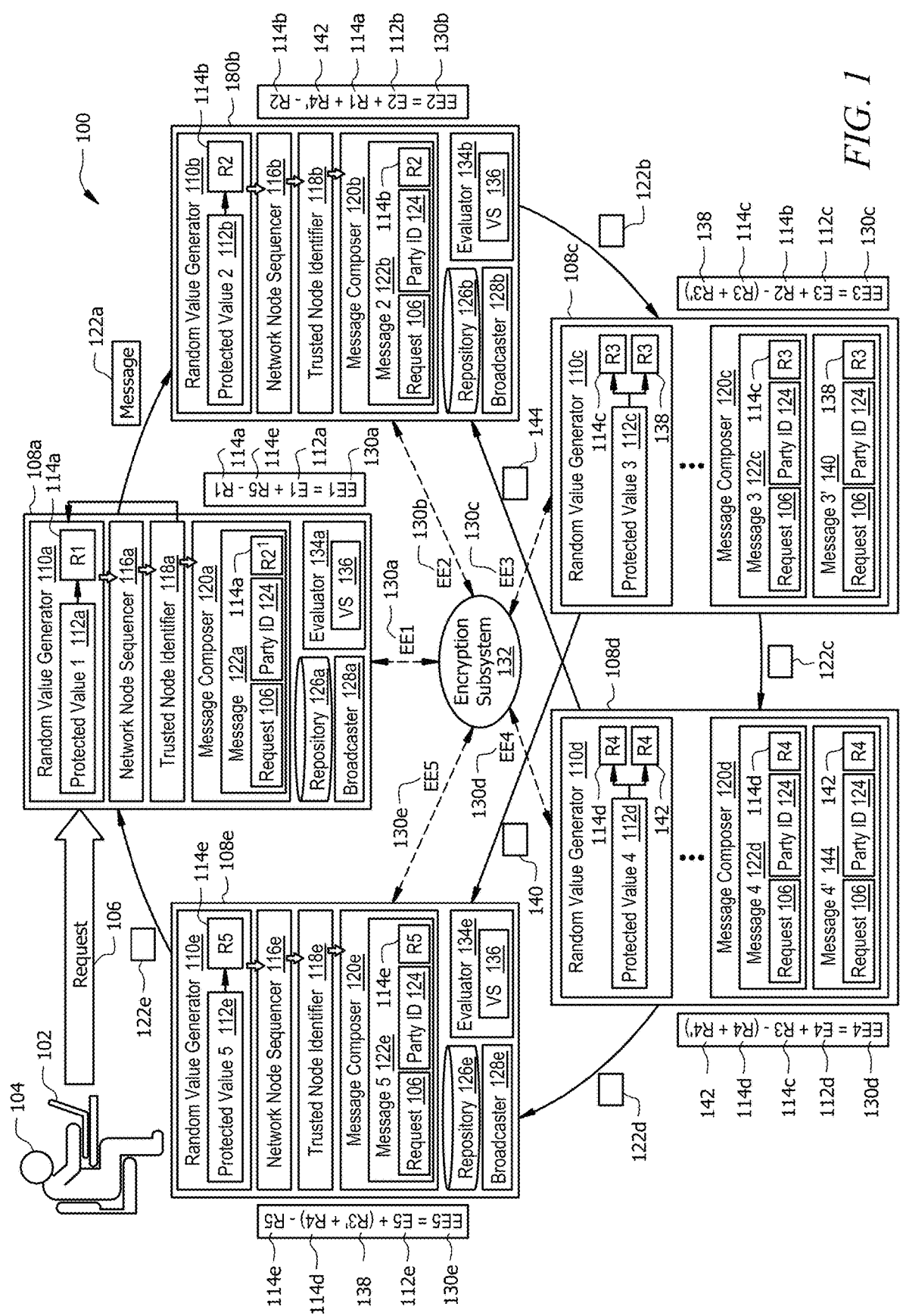
FIG. 1 is a schematic diagram of an example system configured for secure multi-entity collaboration.

FIG. 1 is a schematic diagram of an example system 100 for multi-entity collaboration. The system 100 includes a user device 102, entity devices 108a-e, and a multiple party (multiparty) encryption subsystem 132. The entity devices 108a-e are generally configured to operate in a collaborative architecture via communication amongst the entity device 108a-e and the encryption subsystem 132, such that each entity device 108a-e may determine a validation score (VS) 136 for a request 106 for some service (e.g., for access to information, financing, or the like) from a third party 104. Each of the entity devices 108a-e may operate as a node of a cyclical network for the collaborative determination of the validation score 136. The number of communications (e.g., network calls to provide random numbers 114a-e, 138, 142, described in greater detail below) between entity devices 108a-e in order to determine the validation score 136 is relatively small and scales approximately linearly with the number of entity devices 108a-e. In some cases, a small number of additional communications (e.g., network calls for sending supplemental random numbers 138, 142, described further below) may be sent to provide additional information security (e.g., based on the identification of less trusted entity devices 108a-e). The validation score 136 may be shared with the entity devices 108a-e using the multi-party encryption subsystem 132 such that the validation results are securely and rapidly available to entity devices 108a-e participating in the collaboration system 100. The entity operating each entity device 108a-e may be a provider of a service.

The user device 102 may be any device operable to receive an input from a third party 104 corresponding to the request 106. For example, a user device 102 may be a personal computer or a mobile device operated by the third party 104. Each user device 102 may include the processor, memory, and/or interface of the device 300 described below with respect to FIG. 3. The user device 102 is in communication with at least one of the entity devices 108a-e. A request 106 generally includes an identification of a requested service (e.g., for creation of an account, access to information, receipt of financing, or the like) and an identification of the requesting third party 104 (e.g., a name or other identifier of the third party 104).

Each of the entity devices 108a-e is generally any device or collection of devices (e.g., a collection of devices implemented as a server, a virtual server, or the like) operable to participate in the collaboration system 100. Each entity device 108a-e is operable to communicate with at least two other entity devices 108a-e (i.e., an entity device 108a-e upstream and another entity device 108a-e downstream from a given entity device 108a-e) and the encryption subsystem 132. Each entity device 108a-e may include the processor, memory, and/or interface of the device 300 described below with respect to FIG. 3. Each entity device 108a-e includes resources for orchestrating the cyclical communication between the entity devices 108a-e illustrated in FIG. 1, such that a validation score 136 can be determined without exposing protected information 112a-e from each entity device 108a-e. The example of FIG. 1 shows five entity devices 108a-e operating in a collaboration network. However, it should be understood that the collaboration network could include any number of entity devices 108a-e. For instance, in some cases, the system 100 may include tens, hundreds, or more of entity devices 108a-e.

Each entity device 108a-e includes a random number generator 110a-e, network node sequencer 116a-e, a trusted node identifier 118a-e, and a message composer 120a-e. The random number generator 110a-e generally determines a random number 114a-e for a protected value 112a-e associated with a request 106 received by at least one of the entity devices 108a-e. For example, the first entity device 108a, upon receiving the request 106, may determine a value 112a-e that is associated with this request 106. For instance, if the request 106 is for financing, the determined value 112a-e may be an amount of financing already provided to the third party 104 by the entity operating device 108a, or an "exposure" of the entity to financing to the third party 104. In this example, the random number generator 110a generates random number 114a based on this exposure value 112a. The random number 114a-e may be the sum of a randomly generated number and the protected value 112a-e. The randomly generated number used to generate random number 114a-e may be generated using any approach, including, for example, a pseudo random number generator.

The network node sequencer 116a-e generally monitors information received from the other entity devices 108a-e and determines the next entity device 108a-e (e.g., node in the collaboration network) to which the random number 114a-e should be transmitted. The network node sequencer 116a-e ensures that the entity devices 108a-e communicate in a linear network, as illustrated in FIG. 1, and that each entity device 108a-e participating in the collaboration system 100 receives a random number 126a-e.

The trusted node identifier 118a-e generally determines whether the next entity device 108a-e identified by the network node sequencer 116a-e is trusted to be the recipient of information from the entity device 108a-e. This approach may significantly reduce the number of network calls sent to achieve the validation score 136, as described further below. For instance, rather than sending a network call to send a message 122a-e to every participating entity device 108a-e, such calls are limited to the next entity device 108a-e in the collaboration network. As described in greater detail below, in some cases, additional random numbers 138, 142 may be determined and transmitted (e.g., via corresponding additional messages 140, 144) to additional entity devices 108a-e to further improve information security, as described in greater detail below. For instance, in the example of FIG. 1, entity device 108c generates an additional random number 138 and provides this number 138 to entity device 108e using message 140.

The message composer 120a-e then generates a message 122a-e that is provided to the next entity device 108a-e in the collaboration system 100. The message 122a includes at least the request 106 (e.g., or information extracted from the request 106, such as an invoice identifier), an identifier 124 of the requesting party 104 (e.g., an identifying name or number of the third party 104), and the random number 114a-e. The message 122a-e may also include information about the entity devices 108a-e participating in the collaboration network. A request repository 126a-e may store a record of requests 106 received by the entity devices 108a,e and other corresponding information, such as received messages 122a-e, 140, 144, transmitted messages 122a-e, 140, 144, validation scores 136, and the like.

The cryptographic broadcaster 128a-e determines an encrypted validation value 130a-e for the entity device 108a-e. The encrypted validation value 130a-e may be determined as the protected value 112a-e plus the sum of all input random numbers 114a-e, 138, 142 for the entity device 108a-e minus the sum of output random numbers 114a-e, 138, 142 for the entity device 108a-e, as illustrated in the example of FIG. 1.

The encrypted value 130a-e is provided to the multiparty encryption subsystem 132. For example, the encrypted value 130a-e may be published using a gossip protocol and secured by the multiparty encryption subsystem 132 to prevent non-participating entities or other unauthorized users from accessing the individual values 130a-e. The multiparty encryption subsystem 132 is described in greater detail below.

A validation evaluator 134a-e receives information from the encryption subsystem 132 and determines a validation score 136 from this information. In the example of FIG. 1, the validation evaluator 134a-e receives all of the encrypted values 130a-e that were determined by the entity devices 108a-e and provided to the encryption subsystem 132. As an example, the validation score 136 may be determined as the sum of all of the encrypted values 130a-e. In this example, the sum of all of the encrypted values 130a-e corresponds to the sum of all of the protected values 112a-e stored by the entity devices 108a-e. As such, the collaboration system 100 allows determination of the sum of these protected values 112a-e, which may represent financing provided to, or owed by, the third party 104 or exposure of each entity to this financing, without any of the individual protected values 112a-e being exposed to the other entity devices 108a-e. The validation evaluator 134a-e may compare the validation score 136 to a threshold value, and if the score 136 is less than the threshold value, the request 106 may be validated. The entity device 108a-e may automatically process the request or the entity device 108a-e may provide a report indicating the request is validated to an appropriate party for processing the request 106.

The multiparty encryption subsystem 132 is generally any device or collection of devices (e.g., a collection of devices implemented as a server, a virtual server, or the like) operable to receive encrypted values 130a-e and store these values in a secure, encrypted format. As an example, the multiparty encryption subsystem 132 may employ a blockchain to ensure data security among the collaborating entities. An example of such an encryption subsystem 132 is described in U.S. patent application Ser. No. 15/869,513 filed Jan. 12, 2018, by Prabakar Rangarajan et al., and titled "System for executing, securing, and non-repudiation of pooled conditional smart contracts over distributed blockchain network," now U.S. Pat. No. 10,817,852 issued Oct. 27, 2020, the entirety of which is incorporated herein by reference.

As described above, in some cases, the trusted node identifier 118a-e determines that an additional random number 138, 142 should be used in the collaborative determination of the validation score 136 in order to further improve information security. For example, the trusted node identifier 118a-e may determine that one or both of the entity devices 108a-e that are sending or receiving information (e.g., messages 122a-e) to the entity device 108a-e is a less trusted device. In such cases, the trusted node identifier 118a-e identifies an additional trusted entity device 108a-e and returns to the random number generator 110a-e to generate an additional random number 138, 142 to provide to an additional device 108a-e. A supplemental message 140, 144 containing the supplemental random number 138, 142 is then provided to another of the entity devices 108a-e.

For example, FIG. 1 illustrates a scenario in which the trusted node identifier of the third entity device 108c (not shown for conciseness) determines that the fourth device 108d is a less trusted device. For example, the trusted node identifier may determine that the entity operating the fourth entity device 108d is an entity on a list of less trusted entities (e.g., using the trusted node record 312 of FIG. 3). In this case, the random number generator 110c generates a supplemental random number 138 (e.g., as the sum of the protected value 112c and a randomly generated number), and the message composer 120c generates a supplemental message 140 that includes the supplemental random number 138. The supplemental message 140 is provided to the fifth device 108e in the cyclical collaboration network shown in FIG. 1. Since the third entity device 108c has output the supplemental random number 138, the supplemental random number 138 is used for determining the encrypted value 130c, as shown in FIG. 1. Similarly, the fifth entity device 108e also uses the supplemental random number 138 in the determination of encrypted value 130e, as shown in FIG. 1.

FIG. 1 also illustrates a scenario in which the fourth entity device 108d determines that a supplemental random number 142 should be generated (e.g., because the entity of one or both of the downstream device 108e and the upstream device 108c relative to device 108d is a less trusted device). In this scenario, the entity device 108d generates a supplemental random number 142 and a corresponding supplemental message 144 that includes the additional random number 142. The message 144 is provided to the second entity device 108b. Since the fourth entity device 108d has output the supplemental random number 142, the supplemental random number 142 is used in determining the encrypted value 130d, as shown in FIG. 1. Similarly, the second entity device 108b also uses the supplemental random number 142 in the determination of encrypted value 130b, as shown in FIG. 1. This approach helps provide additional data security (e.g., to protect value 112d from being exposed to a less trusted entity).

In an example operation of the system 100, the request 106 is an invoice requesting that financing be provided to the third party 104. In some cases, an individual or company may inappropriately provide the same invoice to multiple finance-providing entities in an attempt to obtain the same financing from multiple entities. To protect against such cases, the entity device 108a receiving the request 106 may need to determine whether the same invoice was already financed by another entity before financing is approved. Previous technology relies heavily on disclosures of such actions from the third party 104 providing the request 106 and a lengthy back-and-forth between the entity, the third party 104, and other institutions to obtain all information to determine if the request 106 is valid. This disclosure recognizes that this validation may be performed more rapidly and reliably if information were shared between entities that would receive such requests 106. However, previous technology used for information sharing would reveal protected information 112a-e (e.g., the amount financed to the third party 104 by each entity in this example) to each entity participating in the sharing. The system 100 described in this disclosure overcomes this and other technical problems of previous technology by facilitating information sharing in a manner that allows the validation score 136 to be determined without revealing the individual protected values 112a-e.

In this example operation, the first entity device 108a receives the request 106 and determines the protected value 112a associated with the request 106. For example, for the request 106 for financing, the protected value 112a may be an amount already financed to the third party 104 by the entity operating device 108a. In order to determine whether the request 106 for financing should be validated, the entity device needs to calculate a validation score 136 that corresponds to a total amount of financing being provided to the third party 104 (e.g., to the cumulative exposure of the participating entities associated with devices 108a-e). This validation score 136 can be used to access whether financing should be provided to the third party 104.

The first entity device 108a generates a first random number 114a based on the protected value 112a, as described above with respect to the random number generator 110a and provides this random number 114a to the downstream device 108b (e.g., as part of message 122a). The first entity device 108a also receives a fifth random number 114e generated by the fifth entity device 108e (generated as described below). The first entity device 108a determines a first encrypted request value 130a based on the protected value 112a, the first random number 114a, and the fifth random number 114e, as shown in FIG. 1. The encrypted value 130a is provided to the multiparty encryption subsystem 132. The first entity device 108a receives the other encrypted values 130b-e from the multiparty encryption subsystem 132 and uses these values 130a-e to determine the validation score 136 (e.g., as a sum of the encrypted values 130a-e). The validation score 136 is used to determine whether the request 106 is validated (e.g., if the validation score 136 is less than a threshold value).

The second entity device 108b receives the message 122a that includes random number 114a from device 108a. The second entity device 108b identifies the protected value 112b associated with the request 106. For example, the protected value 112b may be an exposure of the entity operating the second entity device 108b to financing provided to the third party 104. The second entity device 108b generates a second random number 114b based on the protected value 112b, as described above with respect to the random number generator 110b. The second random number 114b is provided to the next device 108c downstream of the second entity device 108b (e.g., as part of message 122b). In this example, the second entity device 108b also receives a random number 142 generated by the fourth entity device 108d (e.g., as part of message 144). The second entity device 108b determines a second encrypted request value 130b based on the protected value 112b, the first random number 114a, the second random number 114b, and the supplemental random number 142, as shown in FIG. 1. The encrypted value 130b is provided to the multiparty encryption subsystem 132. The second entity device 108b receives the other encrypted values 130a,c-e from the multiparty encryption subsystem 132 and uses these values 130a-e to determine the validation score 136 (e.g., as a sum of the encrypted values 130a-e). The validation score 136 may be used to determine whether the request 106 would be validated by the second entity device 108b (e.g., if the validation score 136 is less than a threshold value).

The third entity device 108c receives the message 122b that includes random number 114b from device 108b. The third entity device 108c identifies the protected value 112c associated with the request 106. For example, the protected value 112c may be an exposure of the entity operating the third entity device 108c to financing provided to the third party 104. The third entity device 108c generates a third random number 114c based on the protected value 112c, as described above with respect to the random number generator 110c. The third random number 114c is provided to the next device 108d downstream of the third entity device 108c (e.g., as part of message 122c). In this example, the third entity device 108c also determines a supplemental random number 138 (e.g., because the downstream device 108d is associated with a less trusted entity). In this example, the supplemental random number 138 is provided to the fifth entity device 108e as part of message 140. The third entity device 108c determines a third encrypted request value 130c based on the protected value 112c, the second random number 114b, the third random number 114c, and the supplemental random number 138, as shown in FIG. 1. The encrypted value 130c is provided to the multiparty encryption subsystem 132. The third entity device 108c receives the other encrypted values 130a,b,d,e from the multiparty encryption subsystem 132 and uses these values 130a-e to determine the validation score 136 (e.g., as a sum of the encrypted values 130a-e). The validation score 136 may be used to determine whether the request 106 would be validated by the third entity device 108c (e.g., if the validation score 136 is less than a threshold value).

The fourth entity device 108d receives the message 122c that includes random number 114c from device 108c. The fourth entity device 108d identifies the protected value 112d associated with the request 106. For example, the protected value 112d may be an exposure of the entity operating the fourth entity device 108d to financing provided to the third party 104. The fourth entity device 108d generates a fourth random number 114d based on the protected value 112d, as described above with respect to the random number generator 110d. The fourth random number 114d is provided to the next device 108e downstream of the fourth entity device 108d (e.g., as part of message 122d). In this example, the fourth entity device 108d also determines a supplemental random number 142 (e.g., because the upstream device 108c is associated with a less trusted entity). In this example, the supplemental random number 142 is provided to the second entity device 108b as part of message 144). The fourth entity device 108d determines a fourth encrypted request value 130d based on the protected value 112d, the third random number 114c, the fourth random number 114d, and the supplemental random number 142, as shown in FIG. 1. The encrypted value 130d is provided to the multiparty encryption subsystem 132. The third entity device 108c receives the other encrypted values 130a-c,e from the multiparty encryption subsystem 132 and uses these values 130a-e to determine the validation score 136 (e.g., as a sum of the encrypted values 130a-e). The validation score 136 may be used to determine whether the request 106 would be validated by the fourth entity device 108d (e.g., if the validation score 136 is less than a threshold value).

The fifth entity device 108e receives the message 122d that includes random number 114d from device 108d. The fifth entity device 108e identifies the protected value 112e associated with the request 106. For example, the protected value 112e may be an exposure of the entity operating the fifth entity device 108e to financing provided to the third party 104. The fifth entity device 108e generates a fifth random number 114e based on the protected value 112e, as described above with respect to the random number generator 110e. The fifth random number 114e is provided to the next device 108a downstream of the fifth entity device 108e (e.g., as part of message 122e). In this example, the fifth entity device 108e also receives a random number 138 generated by the third entity device 108c (e.g., as part of message 140). The fifth entity device 108e determines a fifth encrypted request value 130e based on the protected value 112e, the fifth random number 114e, the fourth random number 114d, and the supplemental random number 138, as shown in FIG. 1. The encrypted value 130e is provided to the multiparty encryption subsystem 132. The fifth entity device 108e receives the other encrypted values 130a-d from the multiparty encryption subsystem 132 and uses these values 130a-e to determine the validation score 136 (e.g., as a sum of the encrypted values 130a-e). The validation score 136 may be used to determine whether the request 106 would be validated by the fifth entity device 108e (e.g., if the validation score 136 is less than a threshold value).

Example Method of Operation

Figure 2:
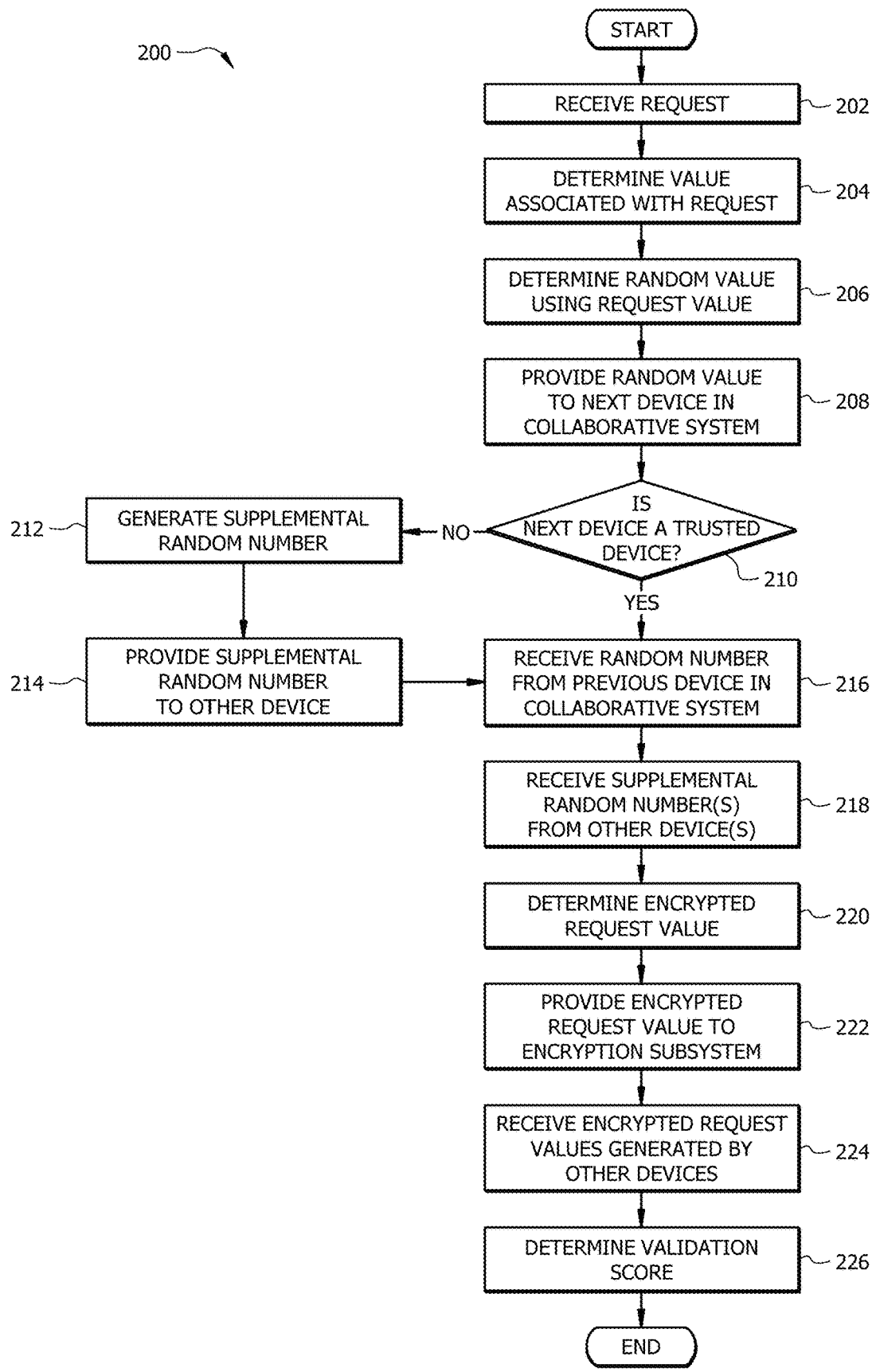
FIG. 2 is a flowchart of a method of secure multi-entity collaboration using the system of FIG. 1.

FIG. 2 illustrates a method 200 for operating the collaboration system 100 described with respect to FIG. 1 above. The method 200 may begin at step 202 where an entity device 108a-e receives a request 106. The request 106 may be for some service such as for creation of an account, access to information, the provision of financing, or the like.

At step 204, the entity device 108a-e determines a value 112a-e associated with the request 106. For example, the determined value 112a-e may be private or protected information that the operator of the entity device 108a-e does not wish to expose to others. For instance, the protected value 112a-e may be an amount of money already provided through financing to the third party 104 that submitted the request 106 received at step 202, and the entity operating the device 108a-e may be barred from sharing this information with others.

At step 206, the entity device 108a-e determines a random number 114a-e using the value 112a-e determined at step 204. For example, the random number 114a-e may be determined by summing the value 112a-e from step 204 with a randomly generated value, as described with respect to the random number generator 110a-e of FIG. 1. In other words, the random number 114a-e may be the protected value 112a-e plus a randomly generated value.

At step 208, the entity device 108a-e provides the random number 114a-e to the next device 108a-e in the cyclical collaboration network illustrated in FIG. 1 (i.e., the device 108a-e downstream from the current device 108a-e). For instance, the network node sequencer 116a-e may determine the next entity device 108a-e in the cyclical network to which the random number 114a-e should be provided. The random number 114a-e may be included in a message 122a-e generated by the message composer 120a-e, as described above with respect to FIG. 1, and this message 122a-e may be provided to the downstream device 108a-e.

At step 210, the entity device 108a-e determines whether the downstream device receiving the random number 114a-e is a trusted device. For example, the entity device 108a-e (e.g., using the trusted node identifier 118a-e) may determine that the entity operating the downstream entity device 108a-e is an entity on a list of less trusted entities (e.g., using the trusted node record 312 of FIG. 3). If the entity device 108a-e determines that the downstream device 108a-e is a less trusted device 108a-e, the entity device 108a-e proceeds to step 212. Otherwise, if the next device 108a-e is a trusted device 108a-e, the entity device 108a-e proceeds to step 216.

At step 212, the entity device 108a-e generates a supplemental random number 138, 142. The supplemental random number 138, 142 may be generated using the same approach described above with respect to step 206. For instance, the supplemental random number 138, 142 may be the protected value 112a-e plus a randomly generated value. At step 214, the supplemental random number 138, 142 is provide to another device 108a-e (i.e., in addition to the device 108a-e downstream of the current entity device 108a-e). For example, as shown in the example of FIG. 1, entity device 108c provides a supplemental random number 138 as part of message 140 to device 108e.

At step 216, the entity device 108a-e receives the random number 114a-e generated by the upstream device 108a-e. For example, in the example of FIG. 1, entity device 108a receives random number 114e generated by the upstream device 108e. At step 218, the entity device 108a-e may receive one or more supplemental random numbers 138, 142 (e.g., as part of a message 140, 144). For example, in the example of FIG. 1, entity device 108b receives supplemental random number 142 as part of message 144 from device 108d, which is not directly upstream of device 108b.

At step 220, the entity device 108a-e determines an encrypted value 130a-e using the protected value 112a-e (see step 204), the generated random number 114a-e (see step 206), and all received random numbers 114a-e, 138, 142 (see steps 216, 218).

For example, as illustrated in the example of FIG. 1, the encrypted value 130a may be the protected value minus the sum of all sent/output random numbers 114a-e, 138, 142 plus the sum of all received/input random numbers 114a-e, 138, 142.

At step 222, the entity device 108a-e provides the encrypted value 130a-e to the multiparty encryption subsystem 132. For example, the entity device 108a-e may provide the encrypted value 130a-e along with any other appropriate encryption information (e.g., a key or the like) in a network call to the encryption subsystem 132. At step 224, the entity device 108a-e receives the encrypted values 130a-e determined by other participating entity devices 108a-e. At step 226, the entity device 108a-e determines the validation score 136 based on the received encrypted values 136. In the example of FIG. 1, this summation of the encrypted values 130a-e results in a determination of the sum of the protected values 112a-e stored by all of the entity devices 108a-e, such that this total value can be determined without revealing any of the individual protected values 112a-e.

Example Device for API integration

Figure 3:
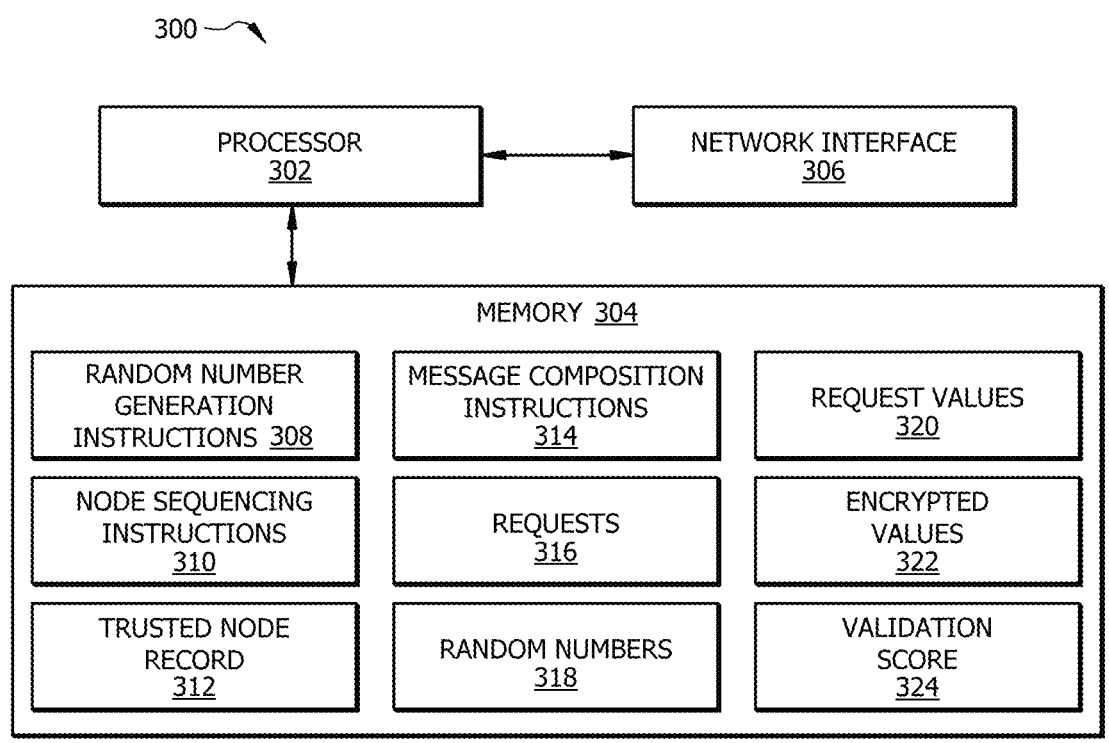
FIG. 3 is a diagram of an example device configured to implement various components of the system of FIG. 1.

FIG. 3 illustrates an embodiment of a device 300 configured to implement various components of the system 100. One or more devices 300 may be used to implement the user device 102, entity devices 108a-e, and multiparty encryption subsystem 132 of FIG. 1. The device 300 includes a processor 302, a memory 304, and a network interface 306. The device 300 may be configured as shown or in any other suitable configuration.

The processor 302 comprises one or more processors operably coupled to the memory 304. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 304 and the network interface 306. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1 and 2. In some embodiments, the function described herein is implemented using logic units, FPGAs, ASICs, DSPs, or any other suitable hardware or electronic circuitry.

The memory 304 is operable to store any of the information described above with respect to FIGS. 1 and 2 along with any other data, instructions, logic, rules, or code operable to execute the function described herein. For example, the memory 304 may store random number generation instructions 308, which include any logic, code, and/or rules for implementing functions of the random number generator 110a-e, described above with respect to FIGS. 1 and 2 (see steps 206, 212 of FIG. 2). The memory 304 may also store node sequencing instructions 310, which include any logic, code, and/or rules for implementing the functions of the node sequencer 116a-e, described above with respect to FIGS. 1 and 2. The memory 304 may also store a trusted node record 312 which may include information and/or instructions used to perform functions of the trusted node identifier 118a-e, described above with respect to FIGS. 1 and 2. The memory 304 may also store message composition instructions 314, which include any logic, code, and/or rules for implementing functions of the message composer 120a-e, described above with respect to FIGS. 1 and 2. The memory 304 may also store requests 316, which includes the request 106 described above with respect to FIGS. 1 and 2. The memory 304 may also store random numbers 318, which include the random numbers 114a-b, 138, 142, described above with respect to FIGS. 1 and 2. The memory 304 may also store request values 320, which include the protected values 112a-e, described above with respect to FIGS. 1 and 2. The memory 304 may also store encrypted values 322, which include the encrypted values 130a-e, described above with respect to FIGS. 1 and 2. The memory 304 may also store validation scores 324, which include the validation score 136, described above with respect to FIGS. 1 and 2. The memory 304 may be volatile or non-volatile and may comprise read-only memory (ROM), random-access memory (RAM), ternary content-addressable memory (TCAM), dynamic random-access memory (DRAM), and static random-access memory (SRAM).

The network interface 306 is configured to enable wired and/or wireless communications. The network interface 306 is configured to communicate data between the device 300 and other network devices, systems, or domain(s). For example, the network interface 306 may comprise a WIFI interface, a local area network (LAN) interface, a wide area network (WAN) interface, a modem, a switch, or a router. The processor 302 is configured to send and receive data using the network interface 306. The network interface 306 may be configured to use any suitable type of communication protocol as would be appreciated by one of ordinary skill in the art.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
 a first service provider device, a second service provider device a third service provider device, a fourth service provider device, and a fifth service provider device, wherein each of the first, second, third, fourth, and fifth service provider devices comprises a corresponding processor and is configured to communicate with a multiple party encryption subsystem, wherein:
  the processor of the first service provider device is configured to:

receive a request from a third party;
determine a first request value associated with the request;
generate a first random number based on the first request value;
provide the first random number to the second service provider device;
receive a fifth random number generated by the fifth service provider device;
determine a first encrypted request value based on the first request value, the first random number, and the fifth random number;
provide the first encrypted request value to the multiple party encryption subsystem;
receive second, third, fourth, and fifth encrypted request values from the multiple party encryption subsystem; and
determine a validation score based on the first, second, third, fourth, and fifth encrypted request values;
the processor of the second service provider device is configured to:
receive the first random number generated by the first service provider device;
determine a second request value associated with the request;
generate a second random number based on the second request value;
provide the second random number to the third service provider device;
determine the second encrypted request value based on the second request value, the first random number, and the second random number;
provide the second encrypted request value to the multiple party encryption subsystem;
receive the first, third, fourth, and fifth encrypted request values from the multiple party encryption subsystem; and
determine the validation score based on the first, second, third, fourth, and fifth encrypted request values;
the processor of the third service provider device is configured to:
receive the second random number generated by the second service provider device;
determine a third request value associated with the request;
generate a third random number based on the third request value;
provide the third random number to the fourth service provider device;
determine the third encrypted request value based on the third request value, the second random number, and the third random number;
provide the third encrypted request value to the multiple party encryption subsystem;
receive the first, second, fourth, and fifth encrypted request values from the multiple party encryption subsystem; and
determine the validation score based on the first, second, third, fourth, and fifth encrypted request values;
the processor of the fourth service provider device is configured to:
receive the third random number generated by the third service provider device;
determine a fourth request value associated with the request;
generate a fourth random number based on the fourth request value;
provide the fourth random number to the fifth service provider device;
determine the fourth encrypted request value based on the fourth request value, the third random number, and the fourth random number;
provide the fourth encrypted request value to the multiple party encryption subsystem;
receive the first, second, third, and fifth encrypted request values from the multiple party encryption subsystem; and
determine the validation score based on the first, second, third, fourth, and fifth encrypted request values;
the processor of the fifth service provider device is configured to:
receive the fourth random number generated by the fourth service provider device;
determine a fifth request value associated with the request;
generate the fifth random number based on the fifth request value;
provide the fifth random number to the first service provider device;
determine the fifth encrypted request value based on the fifth request value, the fourth random number, and the fifth random number;
provide the fifth encrypted request value to the multiple party encryption subsystem;
receive the first, second, third, and fourth encrypted request values from the multiple party encryption subsystem; and
determine the validation score based on the first, second, third, fourth, and fifth encrypted request values.

2. The system of claim 1, wherein:
the processor of the third service provider device is further configured to:
determine that the fourth service provider device is a less trusted device;
in response to determining that the fourth service provider device is a less trusted device:
generate a supplemental third random number;
determine the third encrypted request value based on the third request value, the second random number, the third random number, and the supplemental third random number; and
provide the supplemental third random number to the fifth service provider device; and
the processor of the fifth service provider device is further configured to:
determine the fifth encrypted request value based on the fifth request value, the fourth random number, the fifth random number, and the supplemental third random number.

3. The system of claim 2, wherein:
the third service provider device further comprises a memory configured to store a record of trusted devices; and
the processor of the third service provider device is communicatively coupled to the memory and further configured to determine that the fourth service provider device is the less trusted device by:
comparing an identifier of the fourth service provider device to the record of trusted devices; and
determining, based on the comparison of the identifier of the fourth service provider device to the record of trusted devices, that the fourth service provider device is not included in the record of trusted devices.

4. The system of claim 1, wherein:
the processor of the fourth service provider device is further configured to:
  determine that the fifth service provider device is a less trusted device;
  in response to determining that the fifth service provider device is the less trusted device:
    generate a supplemental fourth random number;
    determine the fourth encrypted request value based on the fourth request value, the third random number, the fourth random number, and the supplemental fourth random number; and
    provide the supplemental fourth random number to the second service provider device; and
the processor of the second service provider device is further configured to:
  determine the second encrypted request value based on the second request value, the first random number, the second random number, and the supplemental fourth random number.

5. The system of claim 4, wherein:
the processor of the fourth service provider device is further configured to determine the fourth encrypted request value as the fourth request value plus the third random number generated by the third service provider device minus the fourth random number provided to the fifth service provider device minus the supplemental fourth random number provided to the second service provider device; and
the processor of the second service provider device is further configured to determine the fourth encrypted request value as the second request value plus the first random number generated by the first service provider device minus the second random number provided to the third service provider device plus the supplemental fourth random number generated by the fourth service provider device.

6. The system of claim 1, wherein the processor of the first service provider device is further configured to determine the validation score by determining a sum of the first, second, third, fourth, and fifth encrypted request values.

7. The system of claim 1, wherein the processor of the first service provider device is further configured to provide the first random number to the downstream device by:
  generating a message comprising the first random number, an identification of a requested service associated with the received request, and an identification of the third party; and
  transmitting the message to the second service provider device.

8. The system of claim 1, wherein the processor of the first service provider device is further configured to determine the first encrypted request value as the first request value plus the fifth random number generated by the fifth service provider device minus the first random number provided to the second service provider device.

9. A method, the method comprising, by a processor of a device communicatively coupled to a multiple party encryption subsystem, a downstream device, and an upstream device:
  receiving a request from a third party;
  determining a first request value associated with the request;
  generating a first random number based on the first request value;
  providing the first random number to the downstream device;
  receiving a second random number generated by the upstream device;
  determining a first encrypted request value based on the first request value, the first random number, and the second random number;
  providing the first encrypted request value to the multiple party encryption subsystem;
  receiving, from the multiple party encryption subsystem, encrypted request values generated by at least the downstream device and upstream device; and
  determining a validation score based on the first encrypted request value and the encrypted request values received from the multiple party encryption subsystem.

10. The method of claim 9, further comprising, by the processor of the device:
  determining that the downstream device is a less trusted device;
  in response to determining that the downstream device is the less trusted device:
    generating a supplemental first random number;
    determining the first encrypted request value based on the first request value, the first random number, the second random number, and the supplemental first random number; and
    providing the supplemental first random number to a second device that is in communication with the upstream device or the downstream device.

11. The method of claim 10, further comprising determining that the downstream device is the less trusted device by:
  comparing an identifier of the downstream device to the record of trusted devices; and
  determining, based on the comparison of the identifier of the downstream device to the record of trusted devices, that the downstream device is not included in the record of trusted devices.

12. The method of claim 10, further comprising determining the first encrypted request value as the first request value plus the second random number generated by the upstream device minus the first random number provided to the downstream device minus the supplemental first random.

13. The method of claim 10, further comprising providing the first random number to the downstream device by:
  generating a message comprising the first random number, an identification of a requested service associated with the received request, and an identification of the third party; and
  transmitting the message to the downstream device.

14. A device comprising:
  a network interface configured to communicate with a multiple party encryption subsystem, a downstream device, and an upstream device; and
  a processor configured to:
    receive a request from a third party;
    determine a first request value associated with the request;
    generate a first random number based on the first request value;
    provide the first random number to the downstream device;
    receive a second random number generated by the upstream device;
    determine a first encrypted request value based on the first request value, the first random number, and the second random number;
    provide the first encrypted request value to the multiple party encryption subsystem;

receive, from the multiple party encryption subsystem, encrypted request values generated by at least the downstream device and upstream device; and determine a validation score based on the first encrypted request value and the encrypted request values received from the multiple party encryption subsystem.

15. The device of claim 14, wherein the processor is further configured to:

determine that the downstream device is a less trusted device;

in response to determining that the downstream device is the less trusted device:

generate a supplemental first random number;

determine the first encrypted request value based on the first request value, the first random number, the second random number, and the supplemental first random number; and provide the supplemental first random number to a second device that is in communication with the upstream device or the downstream device.

16. The device of claim 15, further comprising:

a memory configured to store a record of trusted devices; and wherein the processor is communicatively coupled to the memory and further configured to determine that the downstream device is the less trusted device by:

comparing an identifier of the downstream device to the record of trusted devices; and determining, based on the comparison of the identifier of the downstream device to the record of trusted devices, that the downstream device is not included in the record of trusted devices.

17. The device of claim 15, wherein the processor is further configured to determine the first encrypted request value as the first request value plus the second random number generated by the upstream device minus the first random number provided to the downstream device minus the supplemental first random.

18. The device of claim 14, wherein the processor is further configured to determine the validation score by determining a sum of the first encrypted request value and the encrypted request values received from the multiple party encryption subsystem.

19. The device of claim 14, wherein the processor is further configured to provide the first random number to the downstream device by:

generating a message comprising the first random number, an identification of a requested service associated with the received request, and an identification of the third party; and transmitting the message to the downstream device.

20. The device of claim 14, wherein the processor is further configured to determine the first encrypted request value as the first request value plus the second random number generated by the upstream device minus the first random number provided to the downstream device.

* * * * *